(12) United States Patent
Hebrank

(10) Patent No.: US 6,244,214 B1
(45) Date of Patent: Jun. 12, 2001

(54) CONCURRENT IN OVO INJECTION AND DETECTION METHOD AND APPARATUS

(75) Inventor: John H. Hebrank, Durham, NC (US)

(73) Assignee: Embrex, Inc., Research Triangle Park, NC (US)

( * ) Notice: Subject to any disclaimer, the term of this patent is extended or adjusted under 35 U.S.C. 154(b) by 0 days.

(21) Appl. No.: 09/470,663

(22) Filed: Dec. 22, 1999

Related U.S. Application Data
(60) Provisional application No. 60/114,933, filed on Jan. 6, 1999.

(51) Int. Cl.[7] .............................. A01K 43/00; A01K 45/00
(52) U.S. Cl. ............................................................ 119/6.8
(58) Field of Search ........................... 119/6.8, 6.6, 174, 119/348; 99/532

(56) References Cited

U.S. PATENT DOCUMENTS

| | | | |
|---|---|---|---|
| 4,458,630 | 7/1984 | Sharma et al. ......................... 119/1 |
| 4,593,646 | * 6/1986 | Miller et al. ........................... 119/1 |
| 4,681,063 | 7/1987 | Hebrank ................................. 119/1 |
| 4,682,895 | 7/1987 | Costello ............................... 356/402 |
| 4,703,017 | 10/1987 | Campbell et al. .................... 436/501 |
| 4,743,560 | 5/1988 | Campbell et al. .................... 436/501 |
| 4,786,396 | 11/1988 | Yee et al. ............................. 204/420 |
| 4,903,635 | * 2/1990 | Hebrank ................................. 119/1 |
| 5,028,421 | 7/1991 | Fredericksen et al. ............. 424/85.2 |
| 5,056,464 | * 10/1991 | Lewis ................................... 119/6.8 |
| 5,136,979 | 8/1992 | Paul et al. ............................ 119/6.8 |
| 5,158,038 | 10/1992 | Sheeks et al. ........................ 119/6.8 |
| 5,192,507 | * 3/1993 | Taylor et al. ........................ 422/68.1 |
| 5,438,954 | * 8/1995 | Phelps et al. ......................... 119/6.8 |
| 5,496,701 | 3/1996 | Pollard-Knight ...................... 435/7.4 |
| 5,587,128 | 12/1996 | Wilding et al. ......................... 422/50 |
| 5,591,482 | 1/1997 | He et al. ............................... 427/244 |
| 5,646,039 | 7/1997 | Northrup et al. .................. 435/287.2 |
| 5,770,369 | 6/1998 | Meade et al. ............................ 435/6 |
| 5,784,992 | * 7/1998 | Petitte et al. .......................... 119/6.8 |
| 5,804,453 | 9/1998 | Chen .................................... 436/518 |
| 5,900,929 | * 5/1999 | Hebrank et al. ....................... 356/52 |
| 6,032,612 | * 3/2000 | Williams ............................... 119/6.8 |
| 6,176,199 | * 1/2001 | Gore et al. ............................ 119/6.8 |

FOREIGN PATENT DOCUMENTS

WO93/14629 5/1993 (WO).
WO93/15185 8/1993 (WO).

\* cited by examiner

*Primary Examiner*—Charles T. Jordan
*Assistant Examiner*—Kimberly Smith
(74) *Attorney, Agent, or Firm*—Myers Bigel Sibley & Sajovec

(57) ABSTRACT

A method of injecting a plurality of bird eggs comprises: (a) orienting a plurality of avian eggs in a predetermined position; (b) forming an opening in the shell of each of the eggs; (c) extending an elongate delivery device through each of the openings and into the eggs, each of the delivery devices comprising a detector and an injection needle, with the injection needle having a lumen formed therein; (d) detecting with the detector information from the interior of each of the plurality of eggs; and (e) injecting a substance into each of the plurality of eggs through the lumen of said injection needle. The detected information can be used for a variety of purposes, including adjusting the depth of penetration of the injection needle to more precisely control the location of the injection, identifying the gender of the eggs for subsequent sorting of the eggs, distinguishing viable from non-viable eggs, etc. When used for controlling depth penetration, the method positions the needle tip for any purpose, including withdrawing biological material as well as injecting substances. Apparatus, particularly high-speed apparatus, for carrying out the method is also disclosed.

38 Claims, 8 Drawing Sheets

CONCURRENT IN OVO INJECTION AND DETECTION METHOD AND APPARATUS

RELATED APPLICATIONS

This application claims the benefit of U.S. Provisional Application No. 60/114,933 filed Jan. 6, 1999.

FIELD OF THE INVENTION

The present invention concerns methods and apparatus for the injection of eggs, particularly live embryonated bird eggs.

BACKGROUND OF THE INVENTION

Injection of substances into avian eggs is employed for many reasons, including to decrease post-hatch mortality rates, increase the potential growth rates or eventual size of the resulting chicken, and even to influence the gender determination of the embryo. Similarly, viruses have been injected into live eggs to produce viruses for use in vaccines.

Examples of substances which have been introduced into embryonated poultry eggs via in ovo injection include live culture vaccines, antibiotics, vitamins, and competitive exclusion media (e.g., a live replicating organism). Specific examples of treatment substances are described in U.S. Pat. No. 4,458,630 to Sharma et al, and U.S. Pat. No. 5,028,421 to Fredericksen et al. See also U.S. Pat. No. 4,458,630 to Sharma et al., U.S. Pat. No. 4,681,063 to Hebrank, and U.S. Pat. No. 5,158,038 to Sheeks et al.

In using in ovo injection, the location of the injection will vary depending on the desired result and the injectable being used. U.S. Pat. No. 4,458,630 to Sharma describes injection into the region defined by either the amnion or the yolk sac. Published PCT application W093/15185 describes injection of substances into the air cell of embryonated eggs; PCT application W093/14629 describes injection into the muscle tissue of the embryo contained within the egg.

U.S. Pat. No. 5,136,979 to Paul describes a modular injection system for avian embryos. The system comprises a generally horizontally oriented tooling plate with an opening therethrough, an injector resting generally vertically in the opening in the tooling plate with a lower portion of the injector depending downwardly below the tooling plate and an upper portion of the injector resting at or above the tooling plate. Means are included for raising and lowering the tooling plate and the injector therewith so that when the plate is lowered and the lower portion of the resting injector strikes an egg to be injected, the resting injector stops while the tooling plate proceeds downwardly until the injector disengages from the tooling plate and is free to move in a translational direction independent of the tooling plate. When the tooling plate is raised it reengages the injector and carries it upwardly and away from the egg.

This apparatus described in Paul et al. has been used in the high-speed commercial injection of live bird eggs, and has gained wide acceptance in the industry. The success of this apparatus has made possible the in ovo injection of increasingly sophisticated, and expensive, materials, such as vaccines. The size and location of the internal compartments and structures of avian eggs are, however, inherently variable, and some eggs are occasionally injected in non-optimal sites. Increased injection accuracy is desirable to minimize mis-directed injections, in order to avoid wasting injectables and avoid ineffective injection. Achieving increased injection accuracy requires obtaining useful, real-time information from the interior of the egg during the injection process, which has not heretofore been achieved by prior automated in ovo injection methods and apparatus.

SUMMARY OF THE INVENTION

A first aspect of the present invention is a method of injecting a plurality of bird eggs. The method comprises: (a) orienting a plurality of avian eggs in a predetermined position; (b) forming an opening in the shell of each of the eggs; (c) extending an elongate delivery device through each of the openings and into the eggs, each of the delivery devices comprising a detector and an injection needle, with the injection needle having a lumen formed therein; (d) detecting with the detector information from the interior of each of the plurality of eggs; and (e) injecting a substance into each of the plurality of eggs through the lumen of said injection needle. The injection may be into any suitable location, including the amnion, allantois, embryo, yolk sac, albumen, etc.

The detected information can be used for a variety of purposes, including but not limited to adjusting the depth of penetration of the injection needle to more precisely control the location of the injection, stopping the motion of the injection needle to control the depth of injection, identifying the gender of the eggs for subsequent sorting of the eggs, and distinguishing viable from non-viable eggs so that non-viable eggs need not be injected and/or can be subsequently separated from the viable eggs. Further, the stage of embryonic development can be determined. For example, the air cell and the allantois becomes larger as the embryo gets older, with the air cell having different electrical properties than other compartments of the egg. Hence, the stage of embryonic development can be determined by measuring properties such as the size of the air cell with an electrical probe.

The method may further comprise the steps of: (f) withdrawing the delivery device from each of the eggs and then (g) repeating steps (a) through (e) with a second plurality of eggs to provide an expeditious, high-speed means for automatically injecting and concurrently detecting information from a large number of eggs.

A second aspect of the present invention is a method of precisely positioning a needle tip within an plurality of bird eggs for injecting a substance into or withdrawing a sample from the plurality of eggs. The method comprises (a) orienting a plurality of avian eggs in a predetermined position; (b) forming an opening in the shell of each of the eggs; (c) extending an elongate delivery device through each of the openings and into the eggs, each of the delivery devices comprising a detector and a needle, with the needle having a tip portion and a lumen formed therein, said lumen extending through the tip portion; (d) detecting the detector depth information from the interior of each of said plurality of eggs; and then (e) independently controlling the depth of penetration of each of the needles based on the corresponding needle depth information; whereby a substance can be injected or biological material withdrawn from a particular position of the needle tip portion within each of the plurality of eggs through the lumen of said needle.

A third aspect of the present invention is an apparatus for injecting a plurality of bird eggs with a substance, while also detecting useful information from the interior of the eggs injected. The apparatus includes an alignment assembly for orienting a plurality of bird eggs to be injected. A plurality of injectors are associated with the alignment assembly, which injectors are configured for injecting each of the plurality of bird eggs in a predetermined location. A detector is operatively associated with each of the injection needles for detecting information from the interior of each of the plurality of eggs.

A fourth aspect of the invention is an apparatus for positioning a needle tip for injecting a substance into or withdrawing biological material from a particular location in a plurality of bird eggs. The apparatus comprises an alignment assembly for orienting a plurality of bird eggs to be injected. A plurality of injectors is associated with the alignment assembly and configured for injecting each of the plurality of bird eggs in a predetermined location, each of the injectors including a needle having a lumen through which the substance is injected or the material is withdrawn. A location detector is connected to and operatively associated with each of said injection needles for detecting needle location information from the interior of said egg. A controller is operatively associated with each of the location detectors for independently controlling the depth of penetration of each of the needles.

The foregoing and other objects and aspects of the present invention are explained in detail in the drawings herein and the specification set forth below.

DETAILED DESCRIPTION OF PREFERRED EMBODIMENTS

The invention now will be described more fully hereinafter with reference to the accompanying drawings, in which preferred embodiments of the invention are shown.

As noted below, the invention is particularly adapted to the injection of, or withdrawal of materials from, a plurality of eggs in a high speed apparatus, such as that disclosed in U.S. Pat. No. 5,136,979 to Paul et al., the disclosure of which is incorporated by reference herein in its entirety.

The invention is practiced with eggs, particularly bird or avian eggs, and more particularly poultry eggs, such as chicken, turkey, duck, geese, quail, pheasant, or ostrich eggs. The eggs may be viable eggs; that is, eggs containing a live avian embryo. Viable eggs may be in any stage of embryonic development, including both early embryonic development and late embryonic development. In addition, non-viable eggs may be injected by the present invention for any suitable purpose, such as growing vaccine cultures therein.

Any substance may be injected by the present invention, including but not limited to vaccines, hormones, growth-promoting agents, probiotic cultures such as competitive exclusion media, antibiotics, heterologous nucleic acids including gene transfer vectors, markers such as dyes, etc. The substances may be injected alone, or in combination.

The substance may be injected into any suitable compartment of the egg, including intraperitoneally, intramuscularly, or subcutaneously within the embryo, into the yolk sac or stalk, into the liver or lungs of the embryo, into the air cell, the allantoic sac, the amniotic fluid, the albumen, the blastoderm, etc. Likewise, biological materials or samples may be withdrawn from any of these compartments or materials, when the invention is used to withdraw material from the egg.

The timing of the detecting step will depend upon the particular purpose of the method or feature being detected, and the nature of the material being injected or the sample being withdrawn. In general, the detecting step may be carried out before, after, or concurrently with the injecting step.

Electrical sensors, optical sensors, chemical sensors, temperature sensors, acoustic sensors, pressure sensors (particularly suitable for detecting embryo muscle), or any other device for detecting a physical or chemical parameter may serve as the detection means or detector in carrying out the present invention. The detector or sensor may be connected to the outer side wall of the injection needle, or in the case of an electrical detector, and where the needle is formed from a conductive metallic material rather than an insulative or polymeric material, the side wall of the needle itself may serve as the detector, with suitable circuitry connected thereto. The detector could be one or two (or more) electrodes carried by a non-conductive needle, or carried on an insulated portion of a conductive needle. It will be appreciated that, for the purpose of sensing depth or location within the egg anatomy, for the purpose of distinguishing normal eggs from abnormal eggs (and hence, eggs to be rejected), and for a variety of other purposes, numerous different physical or chemical parameters may be sensed or detected, so long as they provide a useful indication of whether or not the egg should be injected, or a useful indication that a particular depth or position has been achieved.

As used herein, "location" within the egg refers to the various anatomic compartments within an egg (such as the air cell, yolk sac, allantois, amniotic fluid, albumin, avian embryo, blastoderm), or various tissues of the avian embryo itself (e.g., muscle).

The sensor may be positioned at the tip of the needle, or at a predetermined position along the sidewall thereof, and/or spaced apart from the tip of the needle.

Biosensors may be used to carry out the present invention. Numerous biosensors are known. See. e.g., U.S. Pat. Nos.

5,804,453, 5,770,369, 5,496,701, 4,682,895, 5,646,039, 5,587,128, and 4,786,396 (the disclosures of which are incorporated herein by reference).

When an electrical detector is used, it may be desirable to provide a second electrode in operative association with a first electrode. Where two electrodes are employed, they may be both connected to the injection needle, or one may be connected to the injection needle and the other separately inserted through the same opening in the eggshell. In a preferred embodiment, the second electrode is contacted to the exterior of the egg. An electrical signal may be passed through the two electrodes, and the presence or absence of conduction between the two electrodes detected. When the second electrode is simply contacted to the exterior of the egg, the signal is preferably an alternating current signal so that the second electrode is capacitatively coupled to the interior contents of the egg. Preferably each egg (or a flat containing a plurality of eggs) is placed on top of a conductive material prior to detection using an electrical detector (see, e.g., U.S. Pat. No. 5,591,482 regarding conductive polyurethane foam).

When an electrical detector is used to sense the location of a fluid-filled compartment such as the allantois, the electrical detector senses the entry of the probe into the fluid compartment and thus serves as a depth detector (the term "depth detector" encompassing "position detector" herein). In one embodiment of the present invention, the motion of the detector and/or the associated injection needle is halted as the detector and/or the needle enters the compartment. In this manner an injection needle can be halted just after penetrating the allantois, to prevent penetration of the amnion.

Figure 1:
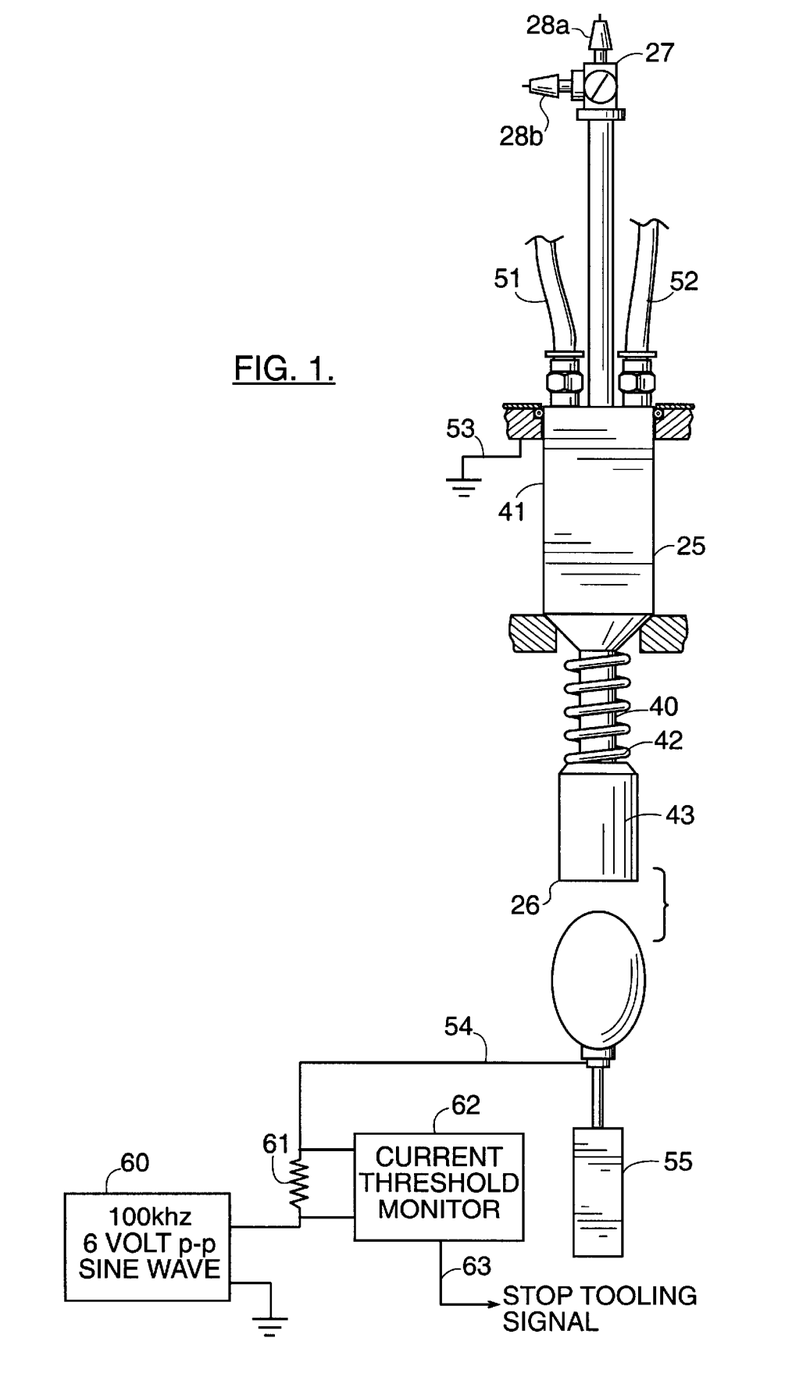
FIG. 1 is a schematic diagram of an apparatus for determining needle penetration into egg fluids and providing a signal to stop needle punch motion. Note that the conductive pad is raised to the egg just before an injection sequence begins.
Figure 4:
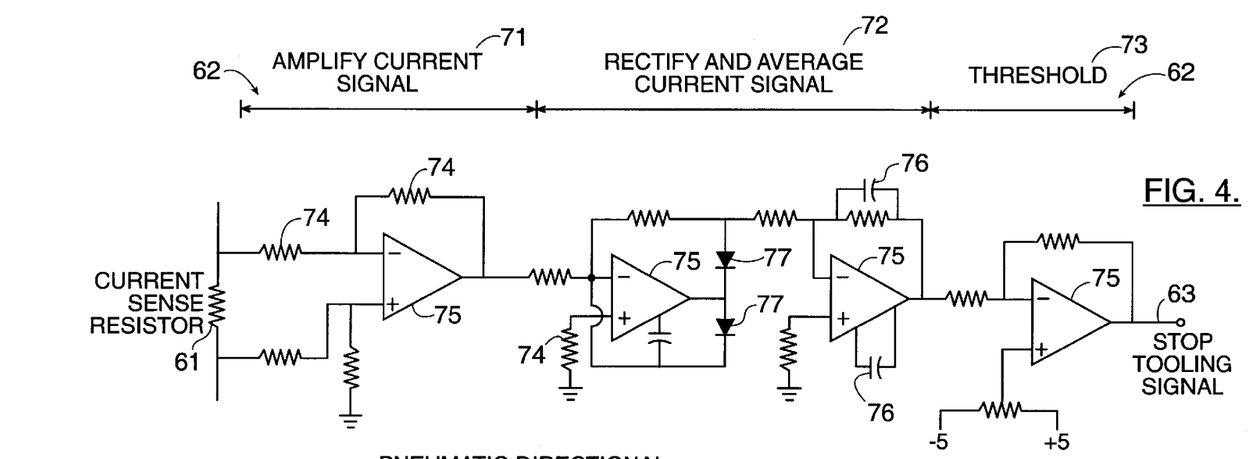
FIG. 4 is a schematic diagram a current sensing, rectification, averaging and threshold circuitry for carrying out the apparatus of FIG. 1.

An electrical detector relies on creation of a complete circuit, and measurement of that completion or of current flow in the circuit. For example, the circuit may comprise conduction in the metallic needle, conduction from the needle tip into the salty allantoic fluid, a capacitive couple between the allantois and the amnion through the thin membrane separating the allantois and amnion, a capacitive couple from the amnion through the eggshell to a conductive pad on the outer shell, and then back through a circuit that senses the flow of an alternating current (AC) signal through the entire circuit. FIG. 1 shows this circuit and current sensing, and the schematic of the electrical sensing system is shown by FIG. 4, both of which are discussed in detail below.

In one embodiment, an air cylinder slowly pushes the detector and associated injection needle into the egg. Entry into fluid can be detected by monitoring conductivity. Completion of the circuit path is detected the instance the needle tip enters the amnion or allantois. When entry into the desired compartment is sensed, air is exhausted from both sides of the air cylinder so that motion stops. Motion halts due to friction in the piston and seals of the air cylinder. Preferably, both sides of the air cylinder are exhausted to prevent backpressure from driving the needle back out of the egg compartment. A magnetic brake may be used in place of, or to supplement, the braking action of the cylinder friction. Where the detector is used to sense a desired egg compartment for injection, and the injection needle is not aligned at the same vertical position with the detector, a delay between the sensing of the appropriate compartment and stopping the motion of the injection needle can be utilized to allow full entry of the injection needle into the sensed compartment.

An optical sensor may comprise a fiber optic fiber, and may be connected to the external wall portion of the injection needle. A light source may be provided through a second fiber optic fiber inserted concomitantly with the needle into the egg, or an external source of illumination may be directed at the egg. Light conduction or transmission properties may be used to determine the viability of the egg, with different light transmission properties or thermal properties distinguishing between live and dead eggs. Light may also detect a color marker for a physiological measurement, a disease measurement, or a gender measurement.

Figures 6A, 6B:
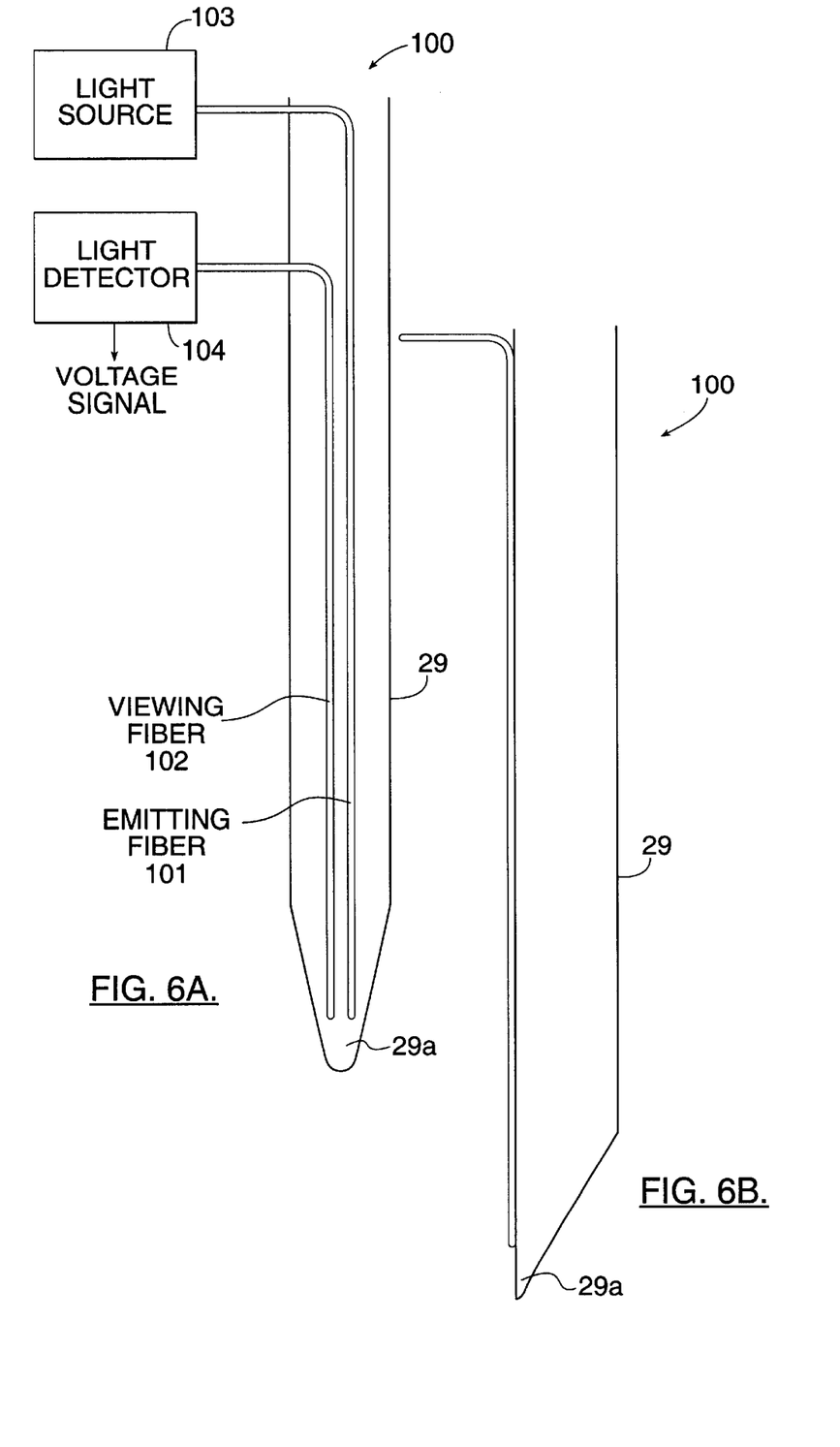
FIG. 6A illustrates an optical detector according to one embodiment of the present invention.
FIG. 6B is a side elevation view of the optical detector of FIG. 6A.

Referring to FIGS. 6A and 6B, an optical detector 100 according to one embodiment of the present invention is schematically illustrated. Two thin (about 0.001 inch to 0.004 inch diameter) optical fibers 101, 102 are bonded to the side of an injection needle 29. The optical fibers 101, 102 are oriented so that light is emitted or received in the direction of the tip 29a of the needle 29. A light source 103 sends visible or infrared light into one fiber 101 (the emitting fiber) to illuminate the area of an egg in front of the needle tip 29a. The second fiber 102 (the viewing fiber) gathers light from the area of the egg in front of the needle tip 29a. The gathered light is conveyed by the viewing fiber 102 to a photodetector 104. The photodetector 104 provides an electrical signal proportional to the intensity of the received light. In open air, the electrical signal is low since only a small portion of light from the emitting fiber 101 scatters off the side of the needle 29 and is received by the viewing fiber 102. As the needle tip 29 and the fibers 101, 102 approach a membrane within an egg, progressively more light from the emitting fiber 101 is reflected back to the viewing fiber 102. Just before the fibers 101, 102 contact a membrane, the signal level drops sharply as light from the emitting fiber 101 is no longer reflected to the viewing fiber 102. As the ends of the fibers 101, 102 penetrate through a membrane, light levels will change again depending upon entry into clear amnion, opaque rotten egg, opaque muscle, or yellow yoke.

Figure 6C:
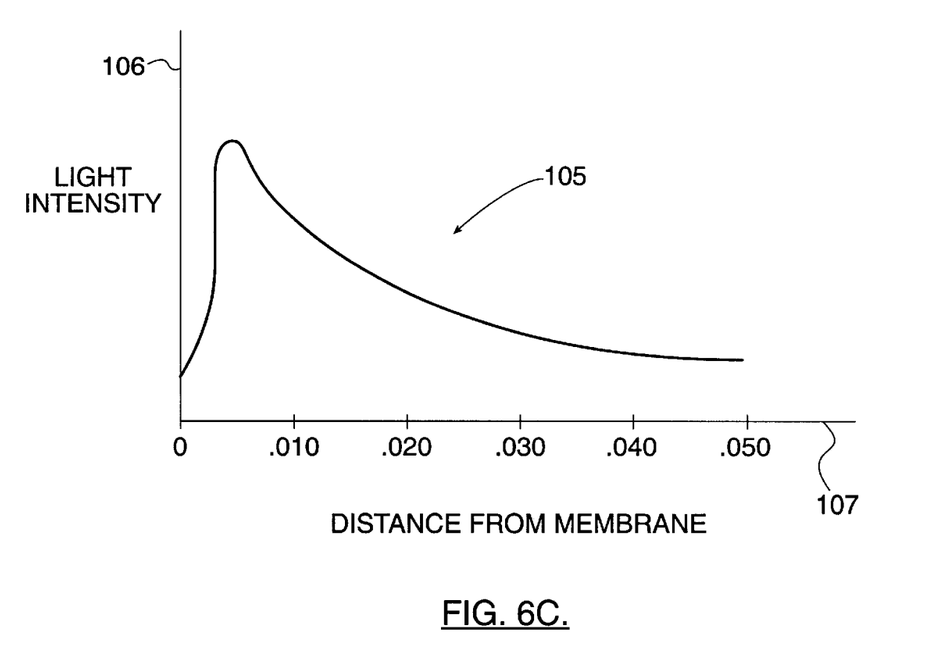
FIG. 6C illustrates an exemplary light intensity curve that indicates distance to a membrane.

In addition, the optical detector configuration illustrated in FIGS. 6A and 6B can be utilized to signal penetration of a membrane or to act as a measure for the distance from a needle to a membrane. FIG. 6C illustrates an exemplary light intensity curve 105 that indicates distance to a membrane. Light intensity is plotted along the Y axis 106 and distance from the tip of a needle to a membrane is plotted along the X axis 107. As illustrated, light intensity increases as a needle approaches a membrane then suddenly decreases just before penetrating through the membrane.

A chemical sensor may be provided in any of a variety of manners known to those skilled in the art of biosensors. For example, a chemical sensor, may be provided through BBL® liposome technology available from Becton Dickinson Microbiology Systems, Cockeysville, Md. USA, or as described in U.S. Pat. Nos. 4,703,017 and 4,743,560, the disclosures of which are incorporated by reference herein in their entirety. The results of such an assay, when the components are be mounted on the injection needle, may be determined by reading with a fiber optic fiber as discussed above. Other chemical assays may be performed by electrochemical detection. Such sensors may be used, for example, to determine the gender of the embryo within the egg, and to detect potential microbiological infection within the egg.

The chemical sensor may be a pH sensor mounted to the injection needle, with the pH measurement being used to detect potential microbial contamination, distinguish live from dead eggs, etc. Ion-specific electrodes to detect various anion or cation species may also be used, as discussed further below. Ion and pH probes sense movement between compartments within an egg by the differences in chemistry of the biological fluids present in the various areas and compartments of an egg.

A temperature sensor may be used to distinguish live from dead eggs based on the temperature thereof, or for the gender sorting of eggs.

An acoustic sensor can be used as a passive or active sensor (i.e., coupled with an acoustic signal source such as a transducer contacted to the external portion of the egg) to determine depth, to distinguish viable from non-viable eggs, etc.

A location or depth sensor can be implemented by any of a variety of techniques. Electrical contact with the air cell membrane can be used to control penetration of the needle relative to preselected compartments of the egg, e.g. to a predetermined depth below the air cell membrane, to insure more accurate injection into the allantois, into the embryo, into the amnion or amniotic fluid, etc. Alternatively, depth can be sensed with a pressure sensor to assess pressure changes during transition of the needle from compartment to compartment within the egg (e.g., air cell to allantois; fluid compartment to muscle tissue; etc.). One suitable method of sensing the location of the sensor measures the pressure exerted on the sensor by the egg media surrounding the sensor. For example, the pressure required to emit a gas or liquid into the media surrounding an exit aperture located in the sensor can be measured using either the injection needle or a hollow gas or fluid-filled tube. The discharge pressure required increases as the exit aperture moves from a gas-filled compartment (e.g., air cell) into a liquid-filled compartment; and increases again as the exit aperture moves from a liquid-filled compartment into a solid tissue (such as embryonic muscle tissue). Changes in pressure can be measured by a pressure measurement device located outside of the egg.

Pressure necessary to force a small amount of fluid from the tip of a needle can indicate the type of material surrounding the end of the needle. The pressure necessary to dispense fluid in muscle is higher than the pressure necessary to dispense fluid into amnion or allantois or air. A pressure detector 110 configured to dispense a small amount of fluid (such as distilled water) 111 into the medium surrounding a needle 29, according to an embodiment of the present invention, is illustrated schematically in FIG. 7. As illustrated, a pressure transducer 112 is connected to a needle inlet 29b and a fixed volume of fluid is dispensed by a positive-displacement pump 114. A pulse of fluid determines if needle 29 is in muscle before dispensing vaccine 115 via pump 116.

Figure 8:
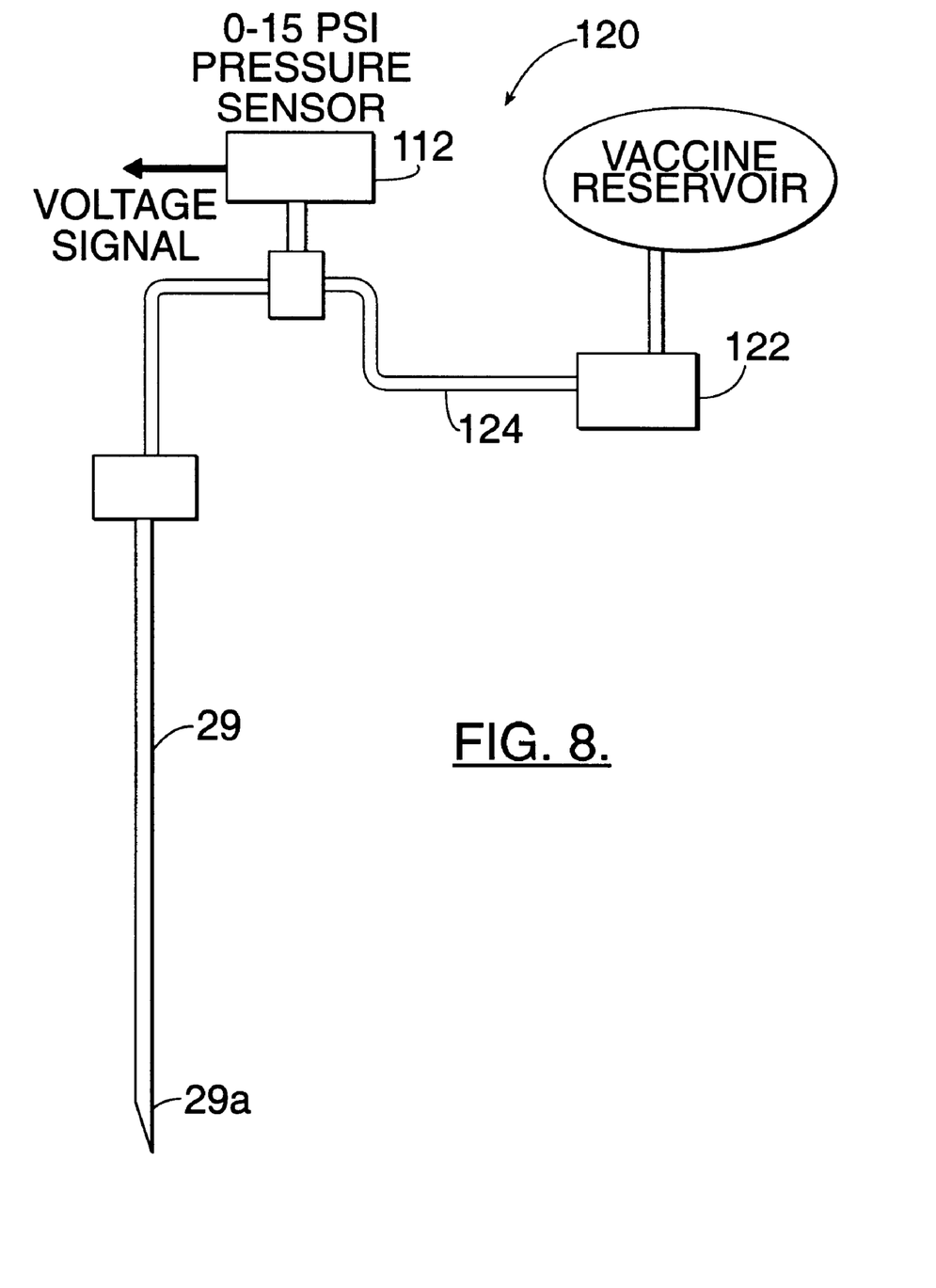
FIG. 8 is a schematic diagram of a pressure detector that is configured to dispense a small amount of fluid into the medium surrounding a needle, according to another embodiment of the present invention.

A pressure detector 120 configured to dispense a small amount of fluid into the medium surrounding a needle 29, according to another embodiment of the present invention, is illustrated schematically in FIG. 8. A small volume of fluid (e.g., five to ten microliters) is cycled in and out of a needle 29 by a cyclic positive displacement pump 122. The pump is preferably a solenoid or cam-driven plate pressing on compliant tubing 124. Alternatively, a cycling displacement piston may be utilized. The tubing 124 is compliant and refills itself by pulling fluid back into needle 29 from the fluid (or air) surrounding the needle tip 29a.

Figure 7:
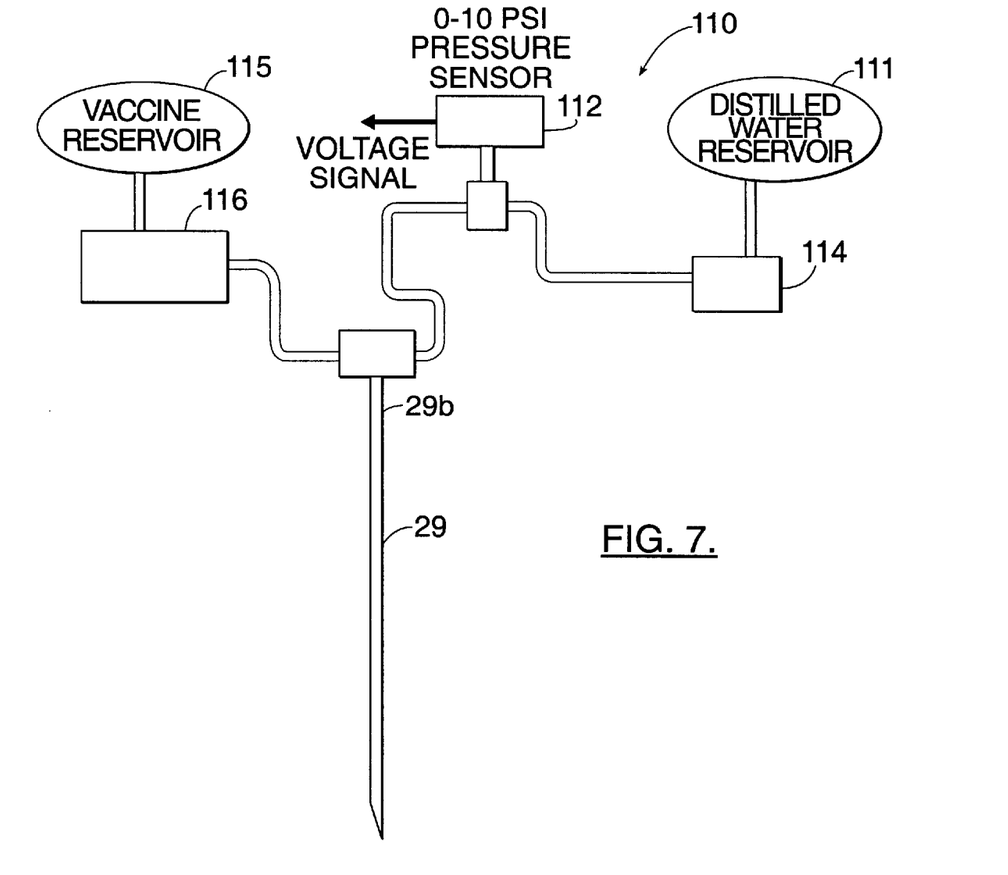
FIG. 7 is a schematic diagram of a pressure detector that is configured to dispense a small amount of fluid into the medium surrounding a needle, according to an embodiment of the present invention.

Using either of the illustrated embodiments of FIGS. 7 or 8, while a needle is in the amnion, fluid moves in and out of the tip of the needle with little pressure. However, when the needle is in muscle, fluid will not flow as easily in or out of the needle and there will be more pressure. This increase in pressure identifies entry into muscle.

A light sensor can be used in conjunction with an external light source or a light source carried by the needle to distinguish whether the needle is in an air-filled compartment such as the air cell, a fluid-filled compartment such as the amnion or allantois, or a solid tissue compartment such as muscle or an internal organ of the embryo itself.

The sensor may be a diagnostic sensor for the detection of a bacterial contamination or other microbiological contamination of the eggs, such as *Escherichia coli, Salmonella*, or *Listeria monocytogenes* contamination of eggs. The diagnostic sensor may be implemented by any suitable means, typically a chemical sensor or biosensor. Detection of a contaminated egg may be used to trigger a signal for subsequent sorting of the contaminated from uncontaminated eggs.

A plurality of sensors may be associated with the needle. For example, where it is desired to detect microbial contamination of the egg, or where it is desired to gender sort the egg, it may be beneficial to provide two different or distinct types of data to provide a more accurate indication of the desired condition. For example, a combination of a pH sensor and a temperature sensor can be combined, or either one can be combined with an optical sensor (with the optical sensor used, for example, to simply detect the clarity of fluids such as albumin).

The detection step may be carried out by withdrawing a biological sample from the egg into a processing system in which subsequent analysis is carried out. For example, a liquid sample may be withdrawn and analyzed to obtain the desired information therefrom in the same manner as available analytical systems for processing small liquid samples (e.g., in which samples are separated by air gaps in the liquid processing line). In such cases, it is necessary to provide a way to identify the egg from which each biological sample is withdrawn, for example by providing hardware, software, or combinations of hardware and software for counting the eggs and the relative position of each egg, in association with the time of sampling and storing that information for a short or long period of time until it is used in the manner desired (e.g., to reject a particular egg, or to provide a large database of information about the quality or some other parameter of the eggs injected). Information on the composition of allantoic fluid, detected with ion sensors, can be used to indicate the true age of the embryo, estimate the time required to hatch, evaluate the operation of the incubation system, etc.

It will be appreciated that the present invention may provide a way to record and store large amounts of information about eggs being injected. For example, population data can be obtained that can be used for quality control programs, or to modify the prior treatment of the eggs, or to modify selective breeding programs. In such cases, the identity of the egg injected may be its association with a particular batch of eggs, rather than its identity as a particular individual within that batch of eggs.

A preferred embodiment of the present invention for injecting multiple eggs concurrently is illustrated in FIGS. 1–4.

Figure 2:
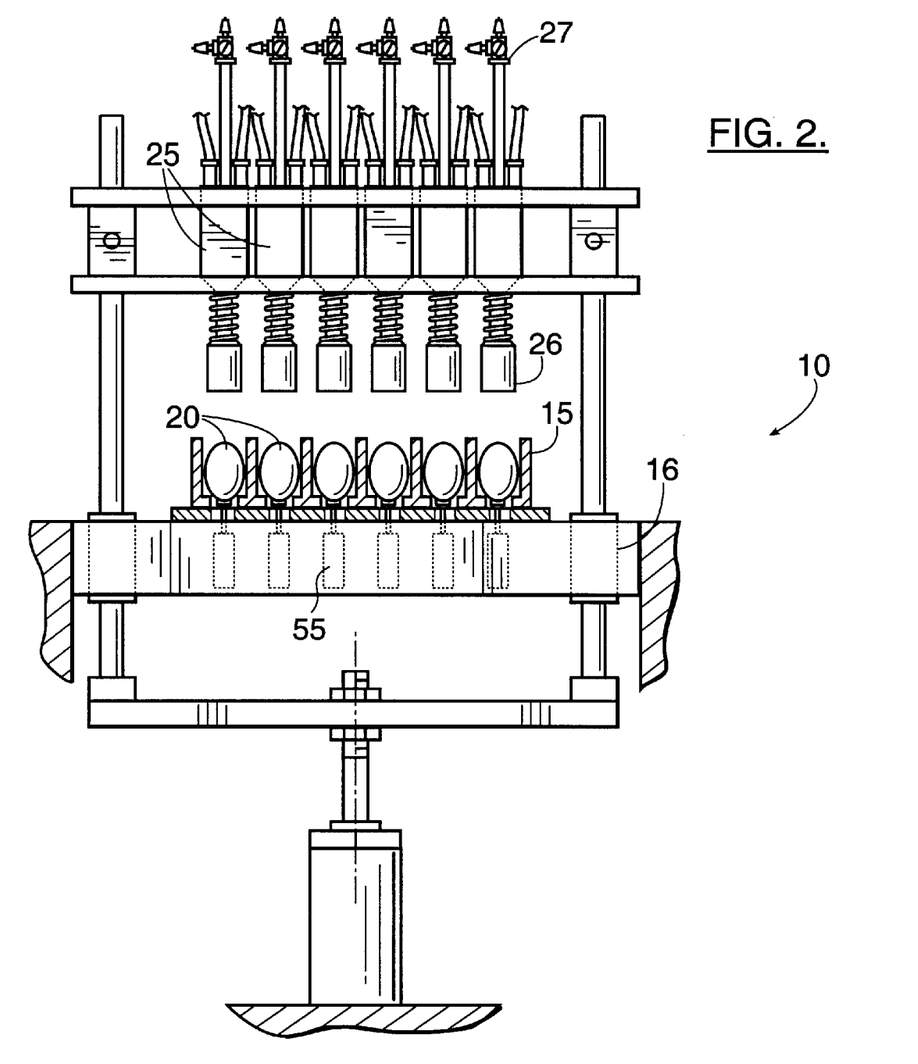
FIG. 2 is a side view of a multiple injection head apparatus useful for carrying out the present invention.
Figure 3:
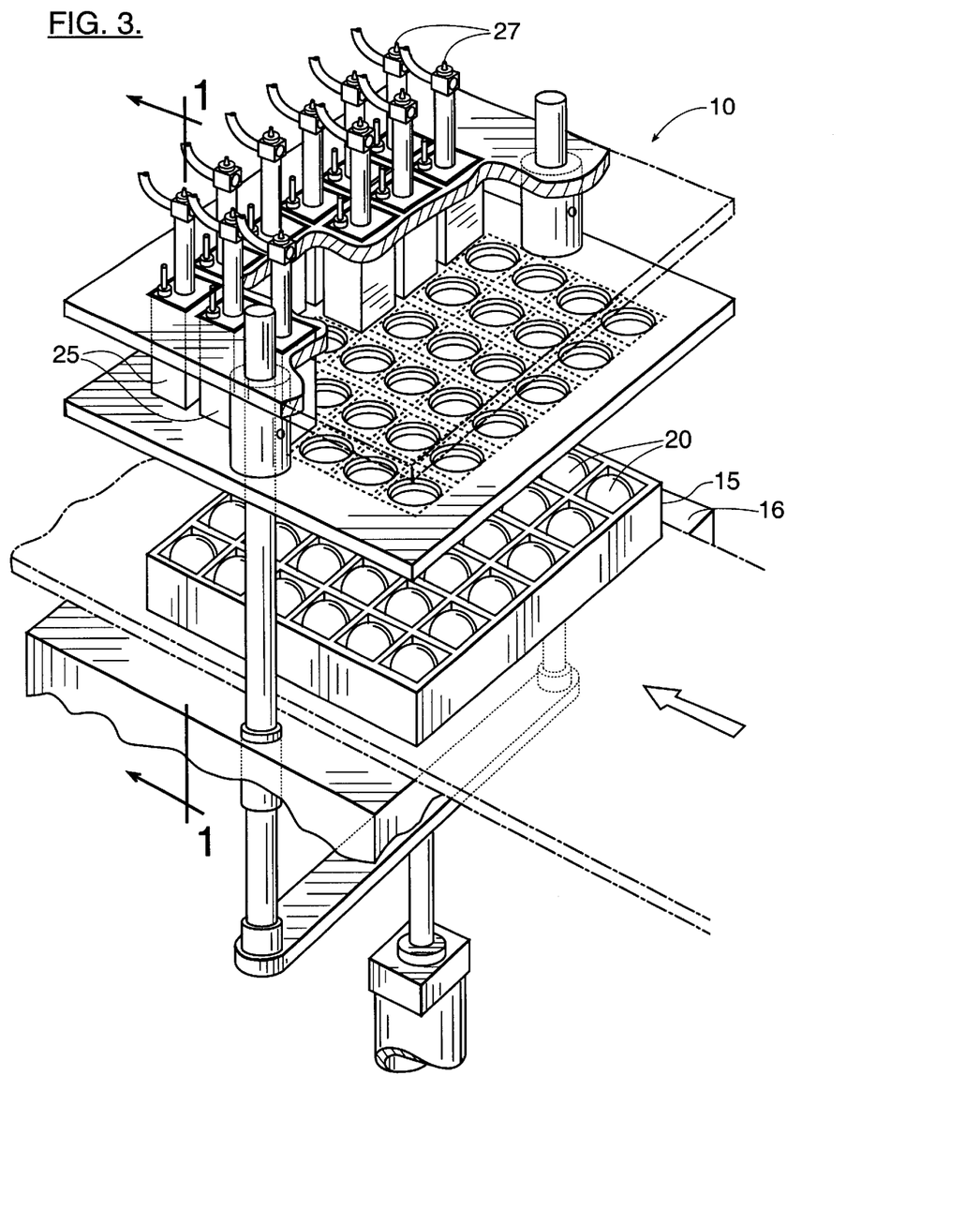
FIG. 3 is a perspective view of the multiple injection head apparatus of FIG. 2.

As shown in FIGS. 2–3, the apparatus 10 includes a flat 15 for carrying eggs, a stationary base 16, and a plurality of conventional injection delivery devices, or heads, 25 with fluid delivery means such as lumens or needle(s) positioned therein in accordance with known techniques. The flat 15 holds a plurality of eggs 20 in a substantially upright position. The flat 15 is configured to provide external access to predetermined areas of the eggs 20. Each egg is held by the flat 15 so that a respective end thereof is in proper alignment relative to a corresponding one of the injection devices 25 as the injection device 25 advances towards the base 16 of the apparatus. As used herein, a "lumen" is a cavity or inner open space of a tube which can be provided by a syringe or needle. A lumen for delivery of a treatment substance may be within a needle, or between a needle and an outer guide or sleeve. Multiple lumens may be formed within a single needle, with the outlet ports positioned on different locations on the needle.

Each of the plurality of injection devices 25 have opposing first and second ends 26, 27. The devices 25 have a first extended position and a second retracted position, as is known in the art. Upon extension of the injection device 25, the first end 26 is configured to contact and rest against predetermined areas of the external egg shell. When not injecting, the injection devices 25 are retracted to rest a predetermined distance above the eggs and stationary base 16. Alternatively, the base 16 can be longitudinally slidably moveable to position the eggs in proper position relative to the injection delivery device or injection delivery needle 29 (see FIG. 5). As shown in FIG. 1, the second end 27 of the injection delivery device includes first and second inlet ports 28a, 28b which are configured to receive tubing respectively from treatment substance chambers. The treatment substances can then be delivered within the needle along separate delivery paths, such as the lumen of an inner needle, and the space between the inner needle and a guide punch. In a preferred embodiment, only a single substance is injected along a single path, and a sanitizing fluid (such as a chlorine solution) is carried in the outer lumen, in accordance with known techniques.

As shown in FIG. 1, the in ovo injection head 25 for delivering compounds inside an egg comprises a body member 40 having opposing top 41 and bottom 43 end portions and an elongate longitudinal aperture formed therein, and a delivery device positioned in said aperture. The device includes an egg locating member, or egg engaging member, on end portion 26, which is slidably connected to the body member and includes a spring 42 to both cushion the engagement, and hold the egg in place during the downstroke of the injection head. An outer guide is preferably provided to pierce the egg shell, and a needle then extends beyond the outer guide and into the desired compartments of the egg, all in accordance with known techniques.

Figure 5:
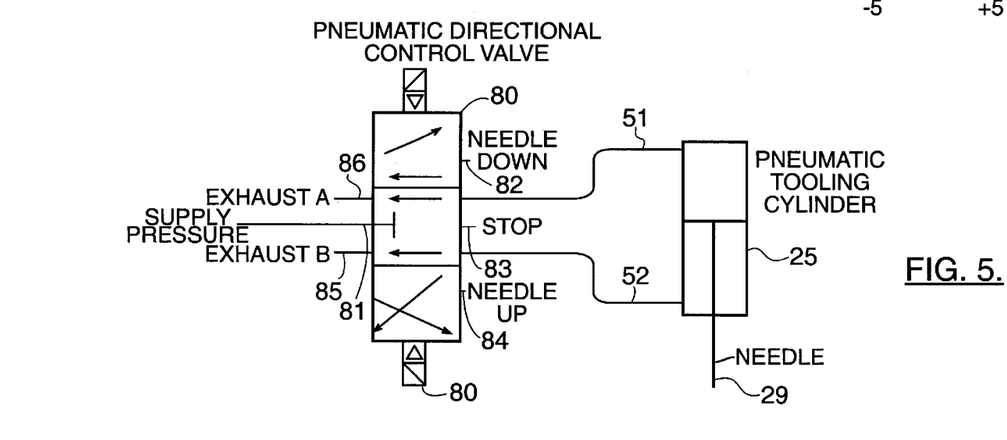
FIG. 5 is a schematic diagram of a pneumatic directional control valve that raises and lowers an injection needle and can halt the injection needle at any intermediate position. Note that motion is sufficiently slow to allow a precise stop signal (more rapid motion can be handled by anticipating the degree of travel prior to delivery of the stop signal).

Pneumatic lines 51, 52, are provided for advancing or withdrawing the injection needle into the egg in the usual manner (see FIGS. 1 and 5). By providing a ground line 53 that is in electrical contact with the injection needle, and an electrical line 54, insulated from ground, that is brought into electrical contact with an egg by plunger assembly 55, the electrical contact of an injection needle to the egg can be sensed. Further, the position of the injection needle within various compartments of the egg can be sensed by changes in conductivity, resistance, capacitance, etc. In the preferred embodiment, an alternating current power supply 60 is employed (specifically, a 100 kilohertz 6 volt peak to peak sine wave), so that capacitive coupling of the current through the egg via line 54 is achieved.

In the preferred embodiment of FIG. 1, the depth information is sensed across current sense resistor 61 by the current threshold monitor 62 to provide a stop tooling signal 63. The current threshold monitor 62, which is illustrated in greater detail in FIG. 4, comprises an amplify current signal portion 71, a rectify and average current signal portion 72, and a threshold detection portion 73, all of which can be assembled from resistors 74, operational amplifiers 75, capacitors 76, diodes 77, etc., in accordance with known techniques, and powered by a power supply (not shown). The stop tooling signal can be supplied to a pneumatic directional control valve 80 as illustrated in FIG. 5. The supply pressure along supply line 81 can then be routed among three positions of needle down 82, stop 83, and needle up 84, by routing pressure through lines 51, 52, or through exhaust lines 85, 86.

The foregoing is illustrative of the present invention, and is not to be construed as limiting thereof. The invention is defined by the following claims, with equivalents of the claims to be included therein.

What is claimed is:

1. A method of injecting a plurality of bird eggs, comprising:

a) orienting a plurality of avian eggs in a predetermined position;

b) forming an opening in the shell of each of said eggs;

c) extending an elongate delivery device through each of said openings and into the eggs, each of said delivery devices comprising a detector and an injection needle, with said injection needle having a lumen formed therein;

d) detecting with said detector information from the interior of each of said plurality of eggs; and e) injecting a substance into each of said plurality of eggs through the lumen of said injection needle.

2. A method according to claim 1, wherein said detecting step is carried out before said injecting step.

3. A method according to claim 1, wherein said detecting step is carried out concurrently with said injecting step.

4. A method according to claim 1, wherein said detecting step is carried out after said injecting step.

5. A method according to claim 1, wherein said detector is an electrical sensor.

6. A method according to claim 5, further comprising the step of contacting a second electrical sensor to the shell of said egg.

7. A method according to claim 6, wherein said second electrical sensor is capacitatively coupled to the contents of said egg.

8. A method according to claim 1, wherein said detector is an optical sensor.

9. A method according to claim 1, wherein said detector is a chemical sensor.

10. A method according to claim 1, wherein said detector is a temperature sensor.

11. A method according to claim 1, wherein said detector is an acoustic sensor.

12. A method according to claim 1, wherein said detector is a pressure sensor.

13. A method according to claim 1, wherein said detecting step comprises:

withdrawing a biological sample from said egg;

identifying the egg from which said biological sample was withdrawn;

obtaining information from said withdrawn biological sample; and then storing said information in association with the identification of the egg from which said biological sample was withdrawn.

14. A method according to claim 1, further comprising the steps of:

identifying the egg from which said information is obtained; and then storing said information in association with the identity of the egg from which said information is obtained.

15. A method according to claim 1, further comprising the steps of:
   f) withdrawing said elongate delivery device from each of said eggs; and then
   g) repeating steps (a) through (e) with a second plurality of eggs.

16. A method according to claim 1, wherein said bird eggs are live embryonated bird eggs.

17. A method of positioning a needle tip for injecting a substance into or withdrawing a sample from a particular location within each of a plurality of bird eggs, comprising:
   a) orienting a plurality of avian eggs in a predetermined position;
   b) forming an opening in the shell of each of said eggs;
   c) extending an elongate delivery device through each of said openings and into the eggs, each of said delivery devices comprising a depth detector and a needle, with said needle having a tip portion and a lumen formed therein, said lumen extending through said tip portion;
   d) detecting needle depth information from the interior of each of said plurality of eggs with said depth detector; and then
   e) independently controlling the depth of penetration of each of said needles based on said corresponding needle depth information; whereby a substance can be injected or biological material withdrawn from a particular position of said needle tip portion within each of said plurality of eggs through the lumen of said needle.

18. A method according to claim 17, wherein said needle tip portion is positioned in allantois.

19. A method according to claim 17, wherein said needle tip portion is positioned in amnion.

20. A method according to claim 17, wherein said needle tip portion is positioned in embryo muscle.

21. A method according to claim 17, wherein said needle tip portion is positioned in an air cell.

22. A method according to claim 17, wherein said needle tip portion is positioned in a yolk sac.

23. A method according to claim 17, wherein said needle tip portion is positioned in blastoderm.

24. An injection apparatus for injecting a plurality of bird eggs with a substance, said apparatus comprising:
   an alignment assembly for orienting a plurality of bird eggs to be injected;
   a plurality of injectors associated with said alignment assembly and configured for injecting each of said plurality of bird eggs in a predetermined location, each of said injectors including an injection needle having a lumen through which said substance is injected; and
   a detector operatively associated with each of said injection needles that detects information from the interior of said egg.

25. An injection apparatus according to claim 24, wherein said detector comprises a depth detector.

26. An apparatus according to claim 25, further comprising control means operatively associated with said detector that controls the depth of penetration of said injection needle.

27. An apparatus according to claim 24, wherein said detector comprises an electrical sensor.

28. An apparatus according to claim 24, wherein said detector comprises an optical sensor.

29. An apparatus according to claim 24, wherein said detector comprises a chemical sensor.

30. An apparatus according to claim 24, wherein said detector comprises a temperature sensor.

31. An apparatus according to claim 24, wherein said detector comprises an acoustic sensor.

32. An apparatus according to claim 24, wherein said detector comprises a pressure sensor.

33. An apparatus according to claim 24, wherein said detector comprises:
   sampling means for withdrawing a biological sample from said egg;
   identifying means for identifying the egg from which said biological sample was withdrawn;
   analyzing means operatively associated with said sampling means for obtaining information from said biological sample; and
   storage means operatively associated with said analyzing means and said identifying means for storing said information in association with the identification of the egg from which said biological sample was withdrawn.

34. An apparatus for positioning a needle tip for injecting a substance into or withdrawing biological material from a particular location in a plurality of bird eggs with a substance, said apparatus comprising:
   an alignment assembly for orienting a plurality of bird eggs to be injected;
   a plurality of injectors associated with said alignment assembly and configured for injecting each of said plurality of bird eggs in a predetermined location, each of said injectors including a needle having a lumen through which said substance is injected or said material is withdrawn;
   a depth detector connected to and operatively associated with each of said injection needles for detecting needle depth information from the interior of said egg; and
   control means operatively associated with said each of said depth detectors for independently controlling the depth of penetration of each of said needles.

35. An apparatus according to claim 34, wherein said depth detector comprises an electrical sensor connected to said needle.

36. An apparatus according to claim 35, wherein said depth detector further comprises a second electrical sensor configured for capacitative coupling to the exterior of each of said eggs.

37. An apparatus according to claim 34, wherein said depth detector comprises a pressure sensor.

38. An apparatus according to claim 34, wherein said depth detector comprises an acoustic sensor.

* * * * *